United States Patent [19]
Schneider et al.

[11] Patent Number: 5,317,859
[45] Date of Patent: Jun. 7, 1994

[54] PRODUCT ORIENTER AND LOADER

[75] Inventors: Thomas C. Schneider, Oak Forest; James C. Lonn, Naperville; David E. Weyl, Park Forest, all of Ill.

[73] Assignee: Advanced Pulver Systems, Inc., Chicago Ridge, Ill.

[21] Appl. No.: 954,953

[22] Filed: Sep. 30, 1992

[51] Int. Cl.$^5$ .......................... B65B 5/10; B65B 35/58
[52] U.S. Cl. ........................................ 53/534; 53/251; 53/260; 53/544
[58] Field of Search ................ 53/252, 251, 250, 249, 53/534, 544, 260, 259, 255, 543, 531

[56] References Cited

U.S. PATENT DOCUMENTS

| | | |
|---|---|---|
| 2,822,932 | 2/1958 | Patrick . |
| 2,875,908 | 3/1959 | Woodcock . |
| 2,878,948 | 3/1959 | Keyes . |
| 2,897,948 | 8/1959 | Cranston, Jr. .................. 198/33 |
| 3,045,802 | 7/1962 | Miller, Jr. ..................... 198/33 |
| 3,137,286 | 6/1964 | Raynor . |
| 3,471,038 | 10/1969 | Verrinder . |
| 3,643,822 | 2/1972 | Birchall . |
| 3,954,190 | 5/1976 | Howard et al. . |
| 4,000,820 | 1/1977 | Kurk et al. .................. 53/544 X |
| 4,041,677 | 8/1977 | Reid ........................... 53/543 |
| 4,439,084 | 3/1984 | Werkheiser .................. 414/62 |
| 4,456,116 | 6/1984 | Jarman ........................ 198/414 |
| 4,522,292 | 6/1985 | Euverard et al. ............. 198/374 |
| 4,557,656 | 12/1985 | Ouellette ...................... 414/43 |
| 4,856,263 | 8/1989 | Schneider et al. ............ 53/543 |
| 5,060,457 | 10/1991 | Zambelli ...................... 53/543 |
| 5,083,411 | 1/1992 | Axmann ....................... 53/251 X |
| 5,180,277 | 1/1993 | Pearce et al. ................. 53/260 X |

Primary Examiner—James F. Coan
Attorney, Agent, or Firm—Emrich & Dithmar

[57] ABSTRACT

A product orienting and loading system includes a powered disk conveyor which receives product to be oriented from an infeed conveyor. A turntable is parallel to the support plane of the disk conveyor and is movable between a lowered position below the support plane and a raised position above the support plane and accommodating rotation of the turntable to orient the product. The turntable has cruciform slots for respectively receiving the disks to allow the turntable to pass to its lowered position in any of several rotational orientations spaced 90° apart. The reoriented product is transferred to an endless window conveyor overlying a container supported at a loading level of a loading station. A counter-rotating pusher shifts the product through the window of the window conveyor into the container while the window conveyor moves the container in a discharge direction. Empty containers are delivered to the loading station at a delivery level from which a first elevator lifts them to a standby level and then to an access level, from which they are picked up by a second elevator and carried to the loading level.

22 Claims, 11 Drawing Sheets

Microfiche Appendix Included
(188 Microfiche, 3 Pages)

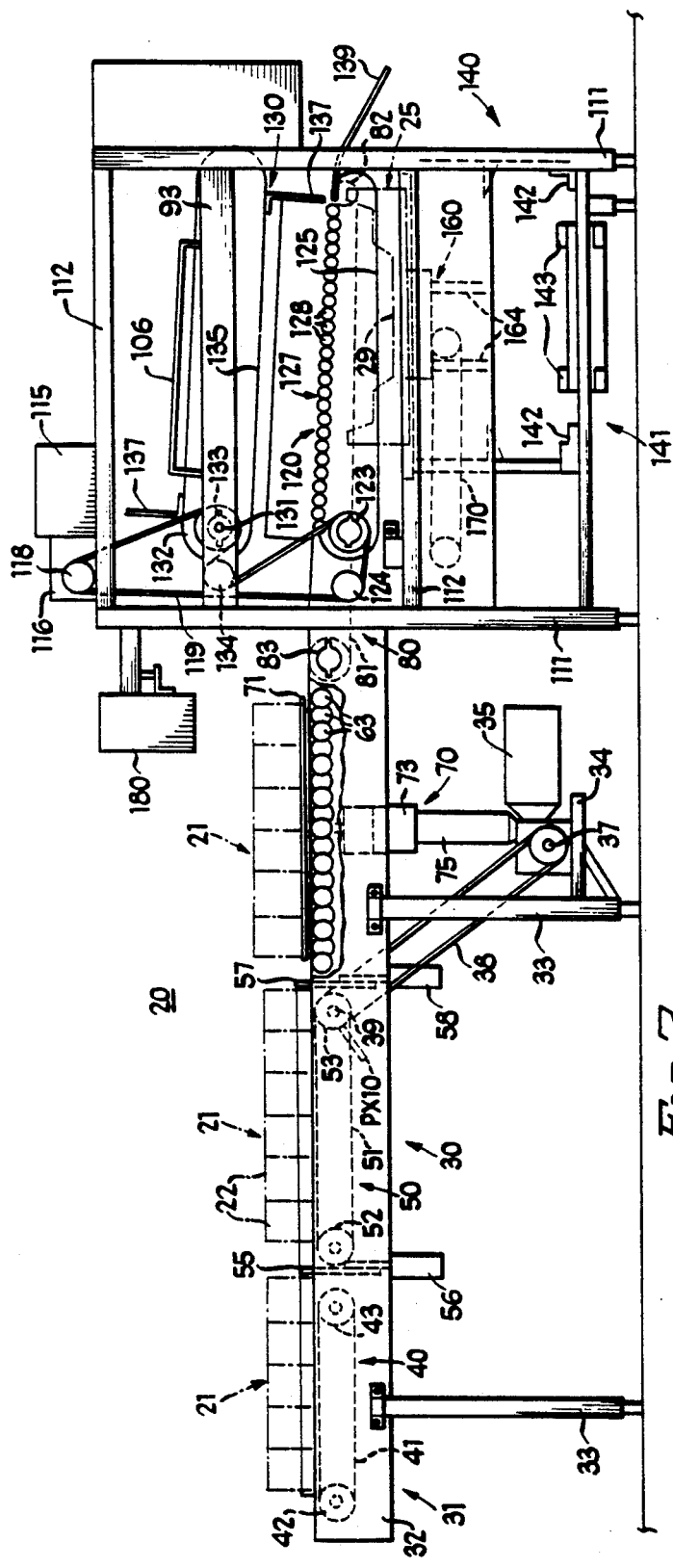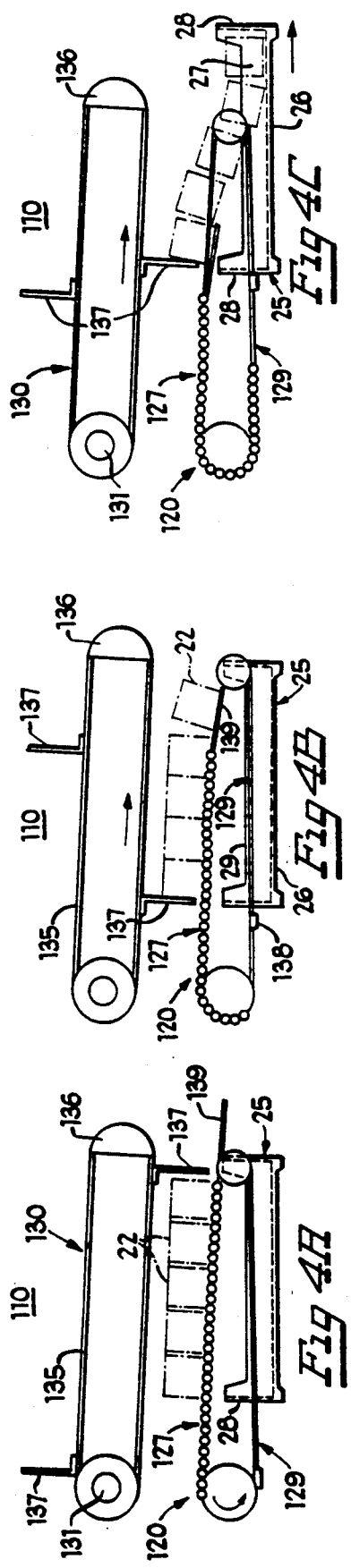

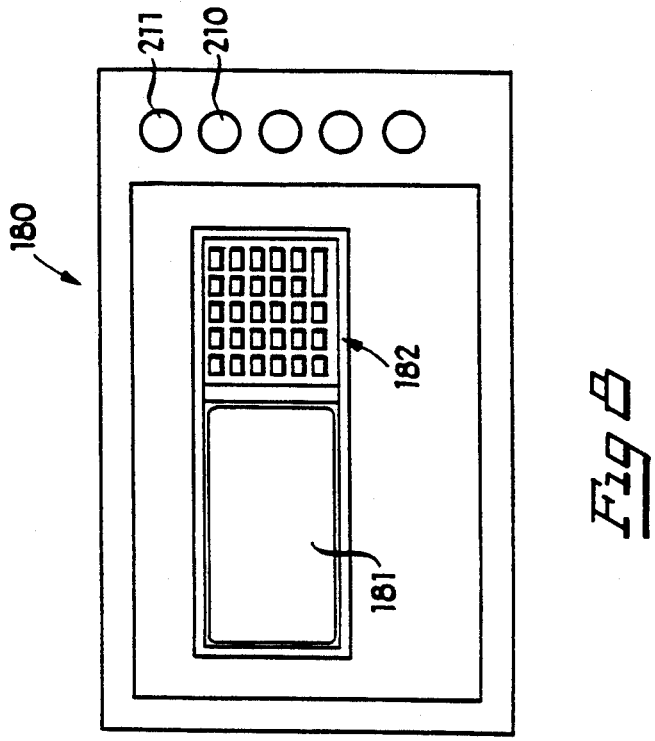
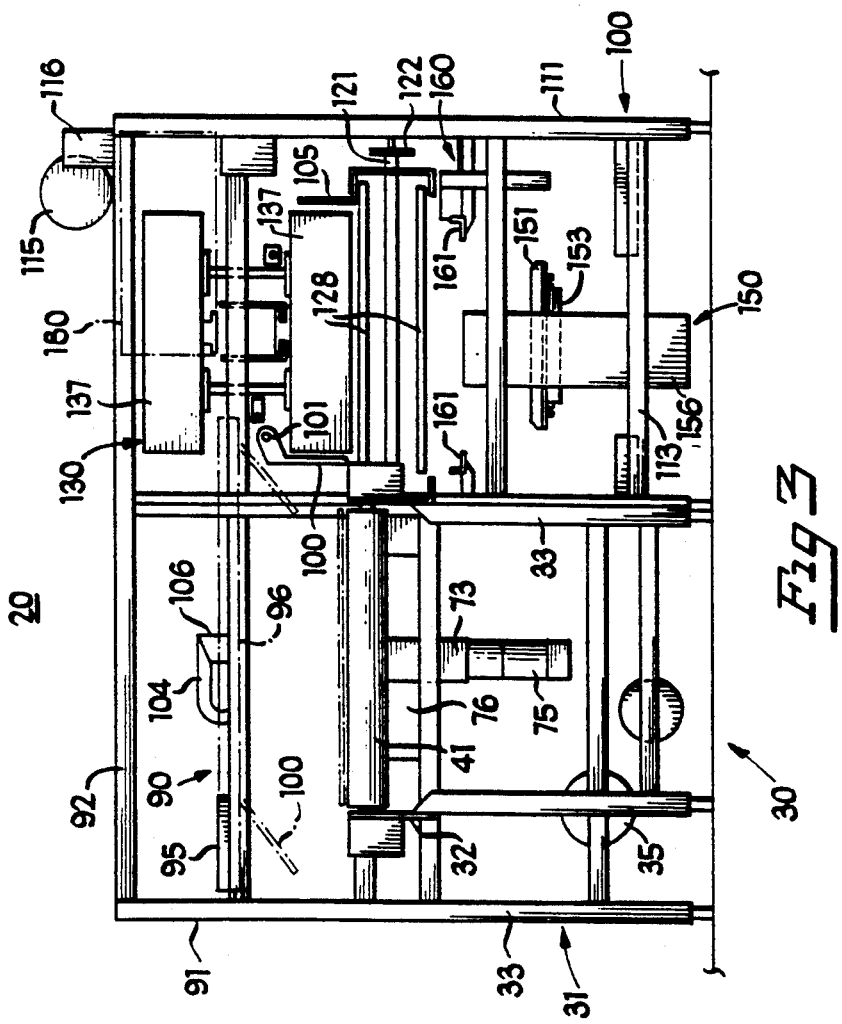
Fig 8
Fig 3

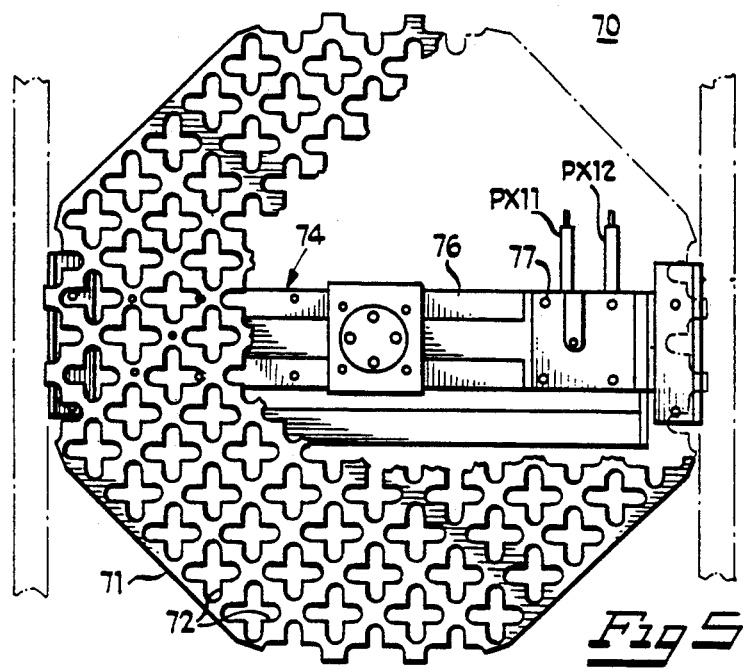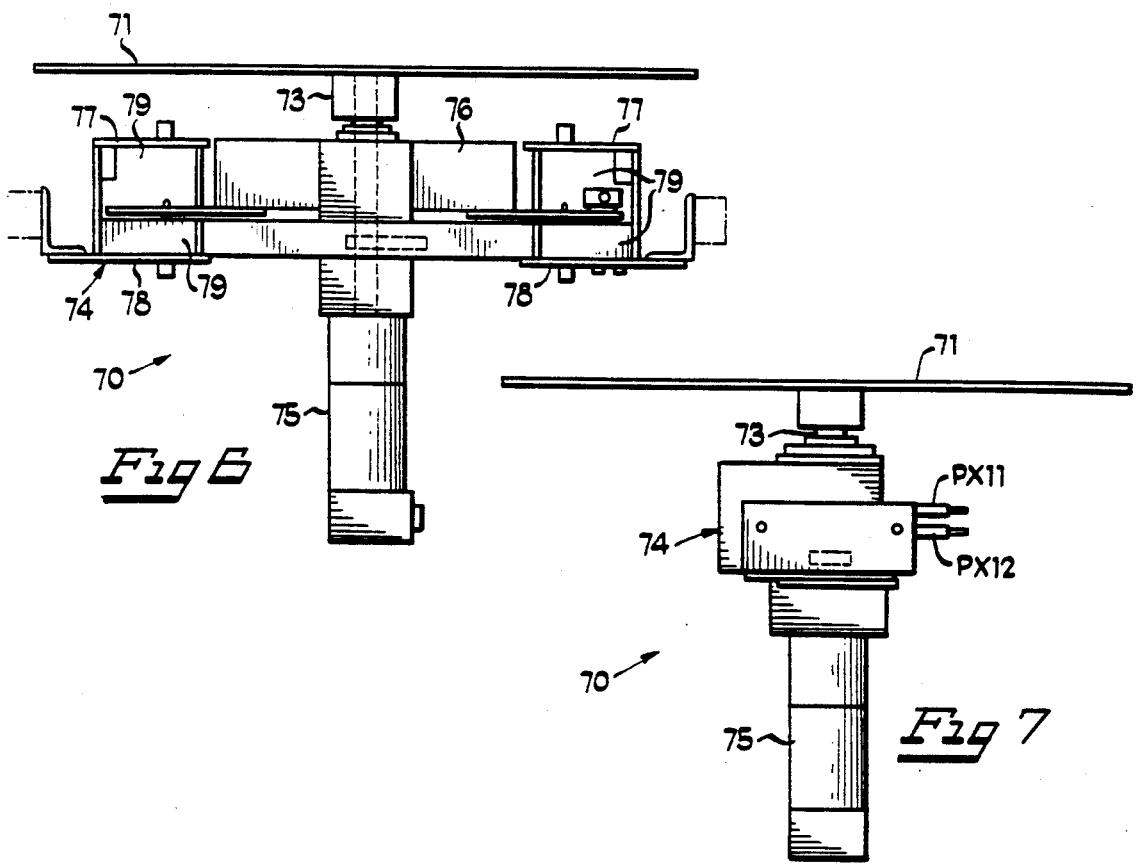

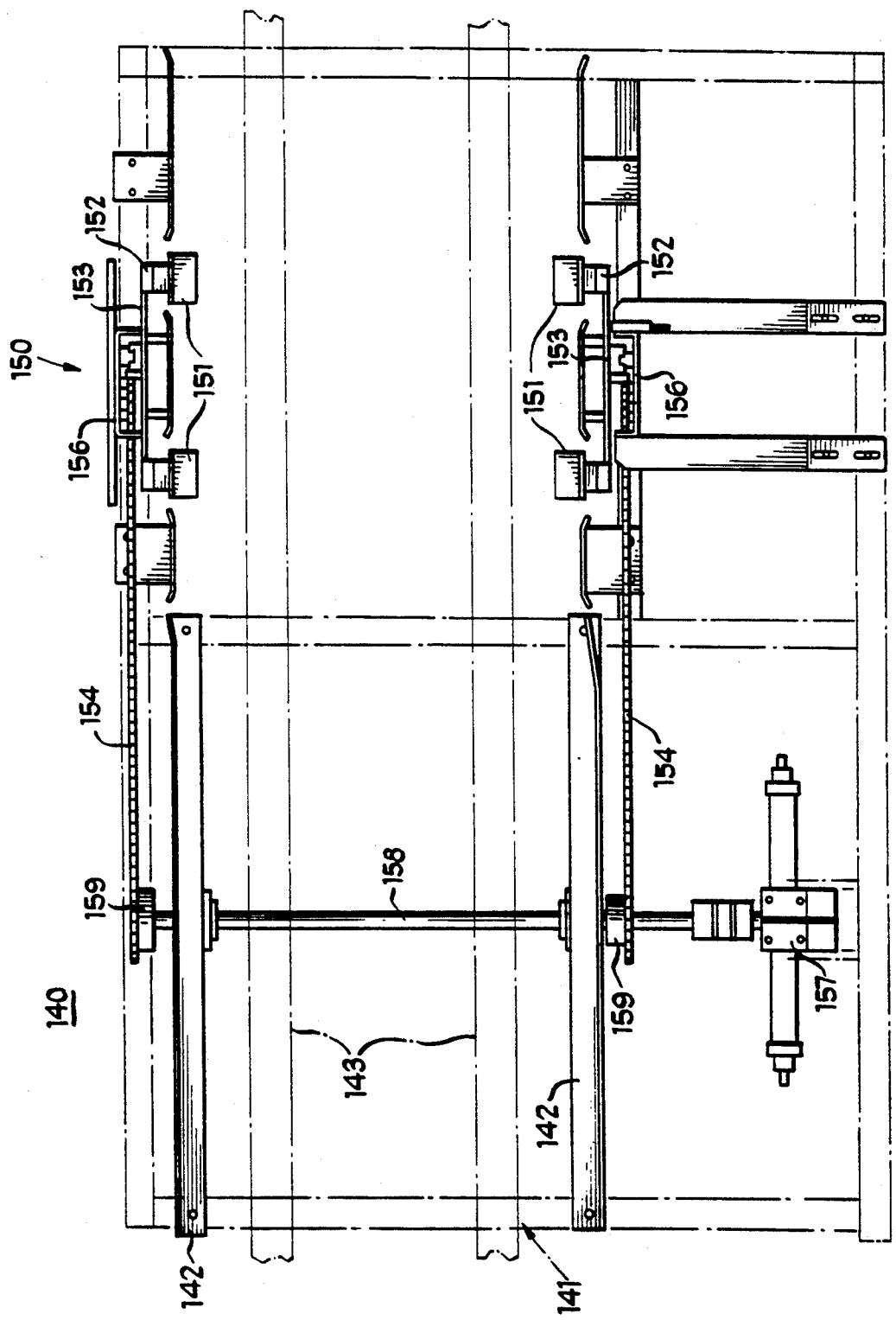

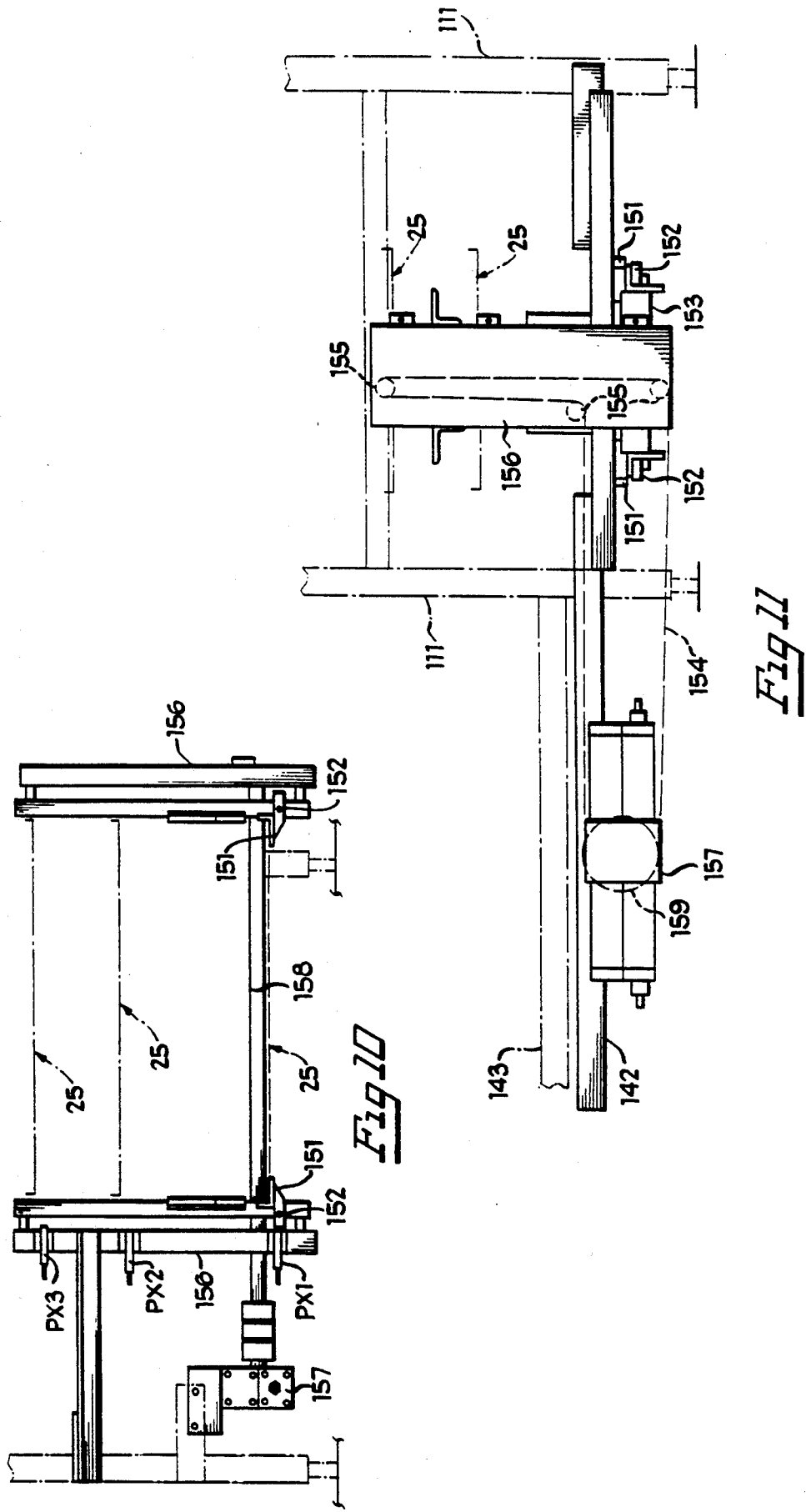

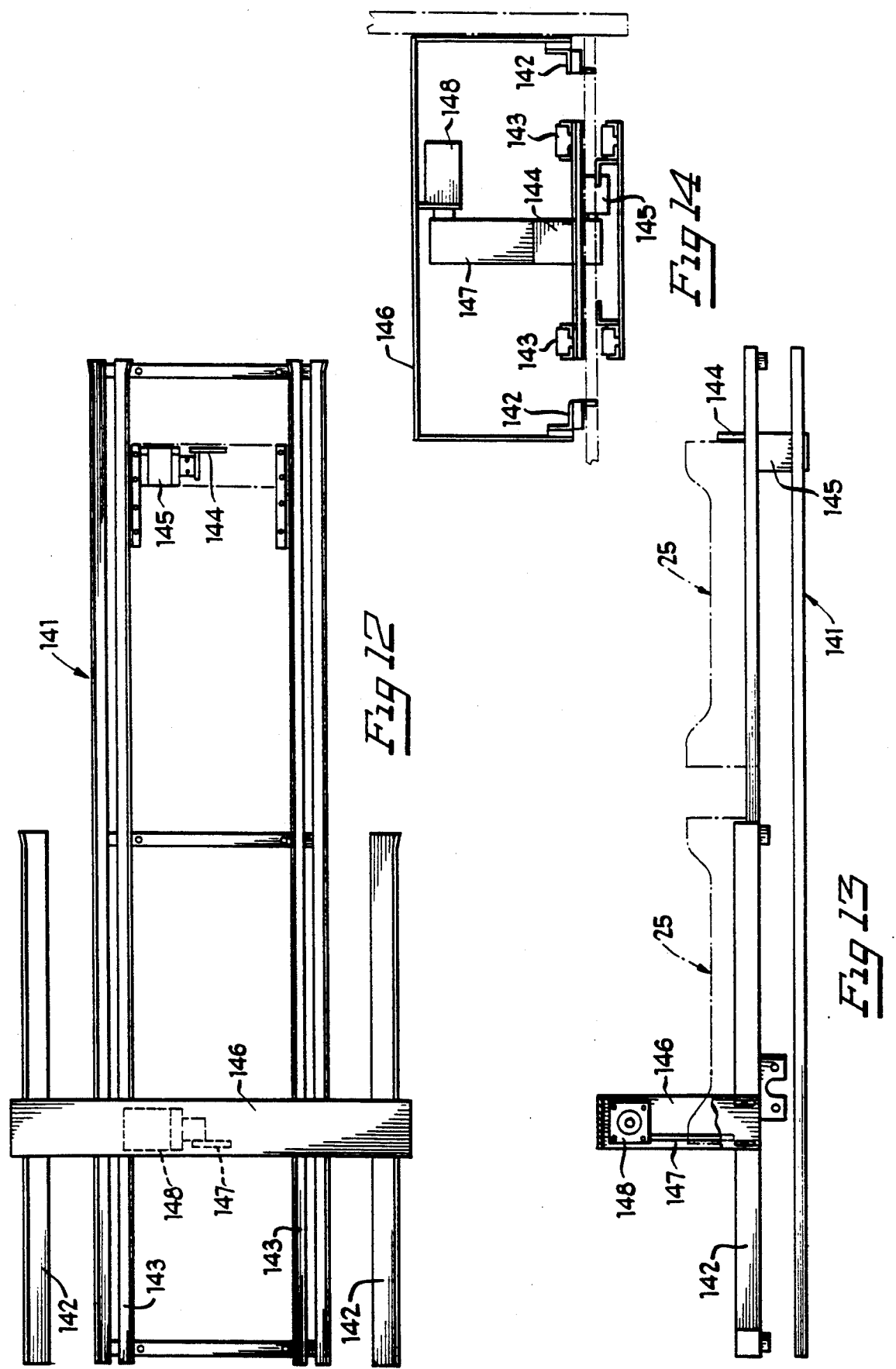

PRODUCT ORIENTER AND LOADER

MICROFICHE APPENDIX

There is submitted herewith a Microfiche Appendix including two microfiche of 69 frames each and one microfiche of 50 frames, setting forth in "rung" logic notation a listing of computer programs for operating the control circuit 200 for the orienting and loading system 20, and the container handling system 140, as well as the program for the stepper motor controller 230.

BACKGROUND OF THE INVENTION

1. Field of the Invention

The present invention relates generally to improvements in apparatus orienting articles to a proper loading orientation and for loading articles into a container. More specifically, the invention relates to the loading of pliable packages of fragile items, such as bakery goods, into containers, such as trays or baskets.

2. Description of the Prior Art

Prior product orienting and loading systems are known, one such system being disclosed in U.S. Pat. No. 4,856,263 to Schneider et al. That system reorients the product by the use of a turntable disposed beneath the upper flight of a window conveyor. Thus, the apparatus must push the product twice during the reorienting operation. First of all, the window conveyor carriers or pushes the product against a stop which holds it while the window conveyor runs out beneath it to allow the product to drop through the window onto the turntable. Then, after the turntable has reoriented the product, the conveyor section of the window conveyor engages the product and pushes it off the turntable. These pushing operations can damage delicate and fragile products, such as bakery products. Furthermore, because of these pushing operations, only certain patterns of product can be accommodated on the turntable without being disturbed by the pushing operations.

The Schneider et al. system also utilizes a window conveyor in loading the product into a container. In that system the speed of the loading operation is limited by the speed of movement of the loading window conveyor.

The Schneider et al. system has a lift mechanism for lifting an empty container from a delivery conveyor to a loading position at which it is transferred to a container support for loading. Pass through of containers on the container conveyor cannot continue until the lift mechanism has been returned to its lowered position. This complicates delivery of containers to a series of orienting and loading machines stationed along the container conveyor.

SUMMARY OF THE INVENTION

It is a general object of the invention to provide an improved system for orienting and loading product, which avoids the disadvantages of prior systems while affording additional structural and operating advantages.

An important feature of the invention is the provision of apparatus for orienting product which is very gentle in handling soft and fragile products.

In connection with the foregoing feature, another feature of the invention is the provision of apparatus of the type set forth, which does not require pushing of the product during the orienting operation.

Another feature of the invention is the provision of a high-speed apparatus for loading product into a container.

Yet another feature of the invention is the provision of a container handling apparatus for the container loading apparatus, which minimizes interference with the conveying of containers past the apparatus on a delivery conveyor.

In connection with the foregoing feature, a further feature of the invention is the provision of an apparatus of the type set forth which includes a lift mechanism for lifting a container from the delivery conveyor and holding it in a raised position, while permitting the conveyor to continue operation.

A still further feature of the invention is the provision of a system which incorporates product orienting and loading and container handling apparatus of the type set forth.

These and other features of the invention are attained by providing product orienting apparatus comprising: conveyor means including a plurality of spaced-apart disks mounted for rotation about parallel axes and being substantially tangent to a common support plane, turntable means including a platform disposed substantially parallel to the support plane and having a plurality of slots therethrough, rotating means for rotating the platform about an axis disposed substantially perpendicular to the support plane, and lift means for moving the platform parallel to the axis between a lowered position below the support plane with the disks received through the slots and a raised position above the support plane to accommodate rotation of the platform, the slots being shaped to receive the disks therethrough in only a limited number of predetermined rotational orientations of the platform.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated

FIG. 2 is a front elevational view of the system of FIG. 1;

FIG. 3 is an end elevational view of the system of FIG. 1, as viewed from the left-hand end thereof;

FIGS. 4A–4C are side elevational views of the loader assembly of the system of FIG. 1, illustrating several stages of operation during the loading of a group of articles into a container;

FIG. 5 is an enlarged fragmentary top plan view of the orienting assembly of the system of FIG. 1, with portions broken away more clearly to illustrate the construction;

FIG. 6 is a side elevational view of the orienting assembly of FIG. 5;

FIG. 7 is an end elevational view of the orienting assembly of FIG. 5;

FIG. 8 is an enlarged front elevational view of the operator interface of the system of FIG. 1;

FIG. 9 is an enlarged, top plan view of the lower elevator of the container handling assembly of the system of FIG. 1;

FIG. 10 is an end elevational view of the lower elevator of FIG. 9;

FIG. 11 is a side elevational view of the lower elevator of FIG. 10;

FIG. 12 is a enlarged top plan view of the container delivery conveyor of the system of FIG. 1;

FIG. 13 is a side elevational view of the container delivery conveyor of FIG. 12, with portions broken away more clearly to illustrate the construction;

FIG. 14 is an end elevational view of a delivery conveyor of FIG. 12;

DESCRIPTION OF THE PREFERRED EMBODIMENT

Figure 1:
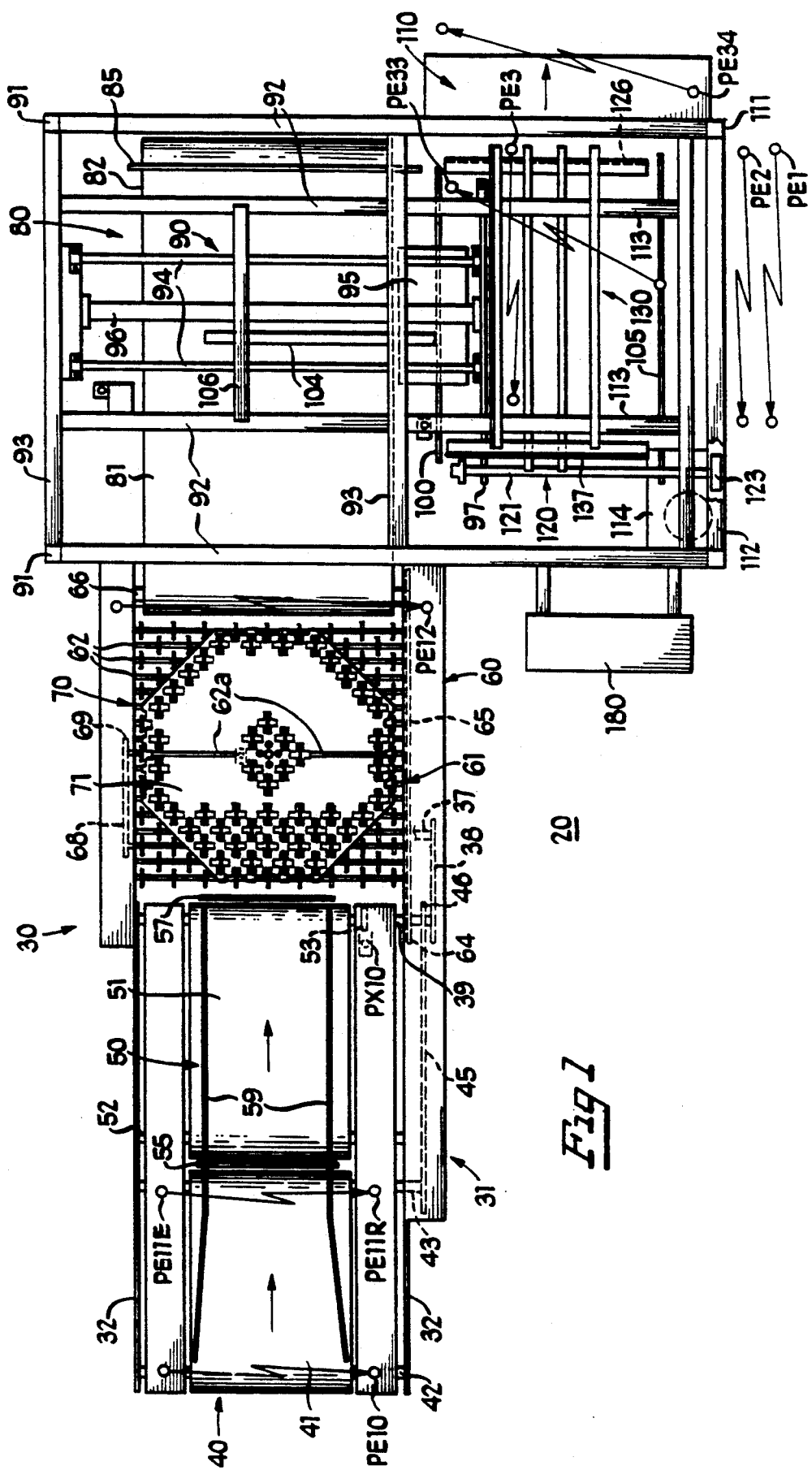
FIG. 1 is a top plan view of an orienting and loading system constructed in accordance with and embodying the features of the present invention.

Referring to FIGS. 1-3, there is illustrated an orienting and loading system, generally designated by the numeral 20, constructed in accordance with the present invention. The system 20 operates for assembling a group or pattern 21 of product articles 22, orienting the pattern and then loading it into a container 25, which may be a baking pan, basket or the like. In the disclosed embodiment, the container 25 is illustrated as being a basket which includes a bottom wall 26 integral at its side edges with upstanding side walls 27 and at its end edges with upstanding end walls 28. Each of the side walls 27 and end walls 28 is preferably provided with an elongated recess 29 in the upper edge thereof centrally thereof. The container 25 may be formed of any suitable material, such as plastic, and each of the walls 27-29 may be perforated or of lattice-type construction to conserve material and weight, all in a known manner. While the principles of the present invention ar operable in connection with the handling of various types of articles, for purposes of illustration, the construction and operation of the system 20 will be described in connection with the handling of soft and fragile articles, for example, articles of baked goods such as packages of sliced bread.

The orienting and loading system 20 includes an infeed assembly 30 which receives the product articles from associated equipment, such as a bagger or the like (not shown). The infeed assembly 30 includes a frame 31 having a pair of elongated, upstanding and laterally spaced-apart side panels 32 supported on a plurality of upright legs 33. The side panels 32 may be interconnected by a plurality of spaced-apart cross members (not shown) in a known manner. Carried by the frame 31 adjacent to the lower end of one of the legs 33 is a horizontal platform 34 on which is mounted a drive motor 35 having a reducing gear box 36 provided with an output shaft 37 carrying a sprocket which engages a drive chain 38. The drive chain 38 is, in turn, coupled to a sprocket on a drive shaft 39 extending between the side panels 32.

The infeed assembly 30 includes an infeed conveyor 40 comprising an endless conveyor belt 41 engaged with an idler roller 42 and a drive roller 43 which extend between the side panels 32 of the frame 31. The drive roller 43 is provided with a sprocket which is engaged with a drive chain 45 which is, in turn, engaged with a sprocket 46 on the drive shaft 39 to effect rotation of the infeed conveyor 40, so that the upper flight of the belt 41 moves in a direction of the arrow of FIG. 1. The infeed assembly 30 also includes a separating conveyor 50 which is disposed adjacent to the discharge end of the infeed conveyor 40 and includes an endless belt 51 engaged around an idler roller 52 and a drive roller 53 on the drive shaft 39, so that separating conveyor 50 is directly driven by the drive chain 38. The drive shaft 39 carries an additional sprocket 53, the teeth of which are counted by a counter PX10 mounted on the frame 31 for determining the length of travel of the separating conveyor 50. The sprockets are so sized that the separating conveyor 50 runs at a higher speed than the infeed conveyor 40, so that it will tend to separate articles received from the infeed conveyor 40.

The infeed assembly 30 is also provided with a stop gate 55 disposed between the infeed and separating conveyors 40 and 50 and operable by a drive cylinder 56 for vertically reciprocating movement between a lowered position permitting free passage of articles from the infeed conveyor 40 and a raised position for stopping articles at the discharge end of the infeed conveyor 40. A stop gate 57 is also provided at the discharge end of the separating conveyor 50 and is similarly moveable between raised lowered and raised positions by a drive cylinder 58. Preferably, guide rails 59 are respectively disposed along opposite sides of the infeed assembly 30 and have outwardly flared ends at the input end of the infeed conveyor 40, for guiding articles along the infeed assembly 30.

Referring also to FIGS. 5-7, the orienting and loading system 20 also includes an orienting assembly 60 which includes a powered disk conveyor 61 disposed at the discharge end of the separating conveyor 50 for receiving article therefrom. The powered disk conveyor 61 includes a plurality of parallel shafts 62 extending between the side panels 32 and a pair of stub shafts 62a respectively extending laterally inwardly from the side panels 32 and having a length less than half the width of the conveyor 61. The inner ends of the stub shafts 62a are supported by suitable brackets coupled to adjacent ones of the shafts 62, so as to provide a central opening through the conveyor 61. Fixedly secured to each of the shafts 62 and 62a is a plurality of laterally spaced-apart disks 63, arranged so that the disks on each shaft are disposed in staggered relationship with respect to the disks on adjacent shafts, and with all of the disks 63 being tangent to a common support plane, which is substantially coplanar with the support surface of the separating conveyor 50. The drive shaft 39 carries a double sprocket 64 which is engaged with a double-stranded drive chain 65 which also engages a sprocket coupled by a clutch to a shaft 66. The chain 65 also engages sprockets on each of the shafts 62 and the adjacent one of the stub shafts 62a for effecting rotation of the disks 63 carried thereby. A drive chain 68 is jumpered from a sprocket on one of the shafts 62 to a sprocket 69 on the stub shaft 62a on the far side of the disk conveyor 61 for rotating that shaft. Preferably, the sprocket sizes are such that the powered disk conveyor 61 operates at a speed slightly less than that of the separating conveyor 50.

The orienting assembly 60 also includes a turntable assembly 70 including a platform 71 which may be generally octagonal in shape and is provided with a plurality of cruciform slots 72 therethrough, dimensioned for respectively receiving the disks 63 therethrough. The platform 71 is disposed substantially parallel to the support plane of the powered disk conveyor 61 and is fixed centrally thereof to the upper end of an elongated vertical shaft 73, the lower end of which is coupled to a stepper motor 75. The shaft 73 extends through the opening in the center of the powered disk conveyor 61. The platform 71 and the stepper motor 75 are carried by a support frame 74. More specifically, the support frame 74 includes a support plate 76 which is fixed to the stepper motor 75 and is vertically movable between fixed upper and lower plates 77 and 78. Air bags 79 are disposed between the movable support plate 76 and the upper and lower plates 77 and 78, respectively.

In operation, the support plate 76 is normally disposed in a lowered position, wherein the platform 71 is disposed beneath the support plane of the powered disk conveyor 61, with the disks 63 being respectively received through the cruciform slots 72. When the lower ones of the air bags 79 are inflated, the support plate 76 and the platform 71 are lifted to a raised position wherein the platform 71 is disposed above the support plane of the powered disk conveyor 61 clear of the disks 63. In this raised position, the stepper motor 75 is operable for rotating the platform 71 about the axis of the shaft 73 among a plurality of predetermined orientations, spaced apart by substantially 90°, so that when the platform 71 is again lowered, by inflation of the upper ones and deflation of the lower ones of the air bags 79, the disks 63 will still fit through the cruciform slots 72. It will be appreciated that when the platform 71 is in its lowered position, the powered disk conveyor carries articles from the separating conveyor 50 to a position overlying the platform 71, which then lifts the articles, rotates them to reorient them, and then lowers them back onto the powered disk conveyor 61, which carries them downstream to a transfer conveyor assembly 80.

The transfer conveyor assembly 80 includes an elongated endless belt 81 which is engaged around the roller on the shaft 66 and an idler roller 82. A clutch 83 is coupled to the shaft 66 for controlling engagement and disengagement of the drive chain 65 therewith. A vertically disposed stop plate 85 overlies the support reach of the transfer conveyor belt 81 and extends transversely thereof adjacent to the idler roller 82. If desired, the stop plate 85 may be manually pivotal to a raised position to accommodate pass-through of articles from the transfer conveyor assembly 80 to auxiliary loading equipment or the like. But in normal operation of the present invention, the stop plate 85 will be disposed in a vertical stop position to prevent articles from being conveyed off the end of the transfer conveyor assembly 80.

The orienting and loading system 20 also includes a transfer pusher assembly 90 which is mounted on an extension of the frame 31 including upstanding posts 91 outboard of the transfer conveyor assembly 80 and extending thereabove and interconnected by cross rails 92 and side rails 93. Disposed a predetermined distance above the transfer conveyor assembly 80 and extending transversely thereof between one of the side rails 93 and a support plate 97 are a pair of parallel shafts 94, spaced apart longitudinally of the transfer conveyor assembly 80. A carriage 95 is mounted for sliding reciprocating movement longitudinally of the shafts 94. This movement is effected by an elongated rodless or band cylinder 96 which extends parallel to the shafts 94 between the support plate 97 and a side rail 93 and contains a piston (not shown) which has a coupling extending upwardly through an elongated sealed slot in the cylinder 96 and coupled to the carriage 95 for effecting movement thereof in response to pneumatic actuation of the cylinder piston. The carriage 95 carries a pusher vane 100 which depends therefrom and is mounted on a pivot shaft 101 for pivotal movement by an associated pneumatic actuator 102 between a raised or retracted position, illustrated in broken line in FIG. 3, and a lowered or pushing position, illustrated in solid line in FIG. 3. Pneumatic lines (not shown) for operating the pusher vane 100 are guided and protected in a flexible plastic chain 104 which extends from the carriage 95 and has an entry end fixed to a support bracket 106 for receiving and guiding the associated pneumatic lines (not shown).

In operation, the carriage 95 reciprocates between a retracted position illustrated to the left in FIG. 3 and an extended position illustrated to the right in FIG. 3. When the carriage 95 is in its retracted position and the pusher vane 100 is lowered to its pushing position, it terminates a very slight distance above the transfer conveyor belt 81 for engagement with the side of the pattern of articles supported thereon. As the carriage 95 advances laterally across the transfer conveyor belt 81, it pushes the articles therefrom into an associated loader assembly 110 disposed outboard of the transfer conveyor 80. A vertically extending stop plate 105 limits the lateral movement of the transferred articles. The pusher vane 100 is then retracted so as to clear any new articles which may have come onto the transfer conveyor belt 81 and the carriage 95 is then retracted.

The loader assembly 110 is supported on a extension of the frame 31 which includes upstanding posts 111 extending upwardly above the level of the infeed assembly 30 outboard thereof and interconnected by a plurality of side rails 112 and cross rails 113. A platform 114 is disposed at the top of the frame adjacent to one of the posts and supports thereon a drive motor 115 having a reduced gear box 116 with an output shaft 117 carrying a sprocket 118 engaged with a drive chain 119. The loader assembly 110 includes a window conveyor 120 which is disposed at a loading station alongside the transfer conveyor assembly 80 and substantially parallel thereto. More specifically, the window conveyor 120 includes a drive shaft 121 carrying a drive sprocket 122 engaged with the chain 119 and a clutch 123. The chain 119 also extends around an idler shaft 124 parallel to the drive shaft 121. The window conveyor 120 includes a pair of spaced-apart conveyor chains 125 engaged with sprockets on the drive shaft 121 and on an idler shaft 126, the window conveyor 120 including a conveyor section 127 comprised of a plurality of free rollers 128 extending transversely between the conveyor chains 125 and supported thereon, and a window section 129 which is devoid of rollers.

The window conveyor 120 is preferably arranged so that the upper or support flight thereof is inclined at a slight angle, preferably approximately 3°, to the vertical, sloping downwardly toward its discharge end to facilitate the removal of product therefrom, as will be explained in greater detail below. Accordingly, the transfer conveyor belt 81 preferably has its support flight inclined at the same angle so as to be substantially coplanar with the support flight of the window conveyor 120 to facilitate the pushing of articles from the transfer conveyor belt 81 onto the window conveyor 120 by the transfer pusher assembly 90.

The loader assembly 110 also includes a loading pusher assembly 130 which overlies the window conveyor 120. More specifically, the loading pusher assembly 130 includes an endless conveyor including a drive shaft 131 having a sprocket 132 engaged with the chain 119 and an associated clutch 133. The chain 119 also extends around an idler sprocket 134, which may be adjustable for varying the tension of the chain 119. The pusher assembly 130 includes a pair of laterally spaced-apart conveyor chains 135 which extend around the draft shaft 131 and a tensioner 136. Equidistantly spaced apart longitudinally of the endless conveyor chains 135 and extending laterally thereacross and fixedly secured thereto are a pair of pusher paddles 137 which project outwardly of the conveyor loop. The loading pusher assembly 130 is preferably inclined at the same angle as the window conveyor 120 and is so positioned that the one of the pusher paddles 1137 which is depending from the pusher conveyor terminates a very slight distance above the support flight of the window conveyor 120 for engagement with product articles supported thereon. Preferably, the window conveyor 120 also includes a discharge bar 138 which extends transversely thereacross and a slide sheet 139 which is a flexible sheet fixed at the trailing end of the conveyor section 127 between the conveyor chains 125.

Referring now also to FIGS. 4A-4C, in operation the window conveyor 120 is normally disposed in a product-receiving condition with its conveyor section 127 disposed along the upper flight for receiving articles 22 from the transfer conveyor assembly 80. An associated empty container 25 is disposed at a loading level of the loading station immediately beneath the window conveyor 120, having been moved to this location by a container handling apparatus 140 to be described more fully below. It will be appreciated that the window conveyor 120 and the endless conveyor of the loading pusher assembly 130 rotate in the same direction (counterclockwise as illustrated). Thus, it will be appreciated that the support flight of the window conveyor 120 and the lower flight of the pusher assembly conveyor will be moving in opposite directions relative to the product articles 22 supported on the window conveyor 120. The clutch 133 will be engaged a short time before the clutch 123 so that when the window conveyor 120 starts to move a pusher paddle 137 will have moved around to the trailing end of the patterns of articles 22. The window conveyor 120 will tend to move the articles 22 to the left, but the articles 22 will be engaged by the pusher paddle 137 (see FIG. 4B) to prevent such leftward movement. As the loader pusher assembly 130 continues moving, the articles 22 will be pushed to the right and the conveyor section 127 of the window conveyor 120 will move out from beneath the supported articles 22, which will then slide down the slide sheet 139 into the container 25 through the window section 129 of the window conveyor 120. In this regard, it will be appreciated that while the container 25 intersects the plane of the lower flight of the window conveyor 120, it is pushed out of the loading station ahead of the conveyor section 127 so as not to interfere with it. As the first article 22 enters the container 25, the discharge bar 138 on the window conveyor 120 will engage the rear end of the container 25 and will start to push the container 25 to the right, in the direction of the arrow in FIG. 4C, so that the articles 22 will be deposited side-by-side in the container 25. The discharge bar 138 will push the filled container 25 off to an associated discharge apparatus (not shown) for delivery to associated equipment such as a stacker or the like After the window conveyor 120 and the pusher assembly 130 have completed one revolution, they will stop in their initial home positions for receiving the next group of articles 22.

Referring now also to FIGS. 12–14, the orienting and loading system 20 includes a container handling system 140 which includes a delivery conveyor 141 which carries containers 25 through the loading station at a delivery level adjacent to the lower end of the loader assembly 110 and in a direction transversely thereof. It will be appreciated that the delivery conveyor 141 may service a plurality of orienting and loading systems 20 arranged generally side-by-side. The delivery conveyor 141 includes a pair of laterally spaced-apart and substantially parallel guide rails 142 disposed for respectively supporting opposite end edges of associated containers 25. Disposed between the guide rails 142 are a pair of conveyor belts 143, the support flights thereof being parallel to the guide rails 142 and substantially at the level thereof. The conveyor 141 includes a stop plate 144 which is pivotally movable by an associated pneumatic actuator 145 between a lowered retracted position accommodating movement of containers 25 along the conveyor 141 and a raised stop position blocking passage of containers 25 along the conveyor 141 at the exit end of the loading station. The conveyor 141 is also provided with an overhead frame 146 upstream of the stop plate 144 which carries a pivoting stop plate 147 which is movable by an associated pneumatic actuator 148 between a raised position, accommodating passage of containers 25, and a depending, substantially vertically disposed stop position for blocking the passage of containers 25 along the conveyor 141.

Referring also to FIGS. 9–11, the container handling system 140 also includes a lower container elevator 150, which includes two pairs of lifters 151 respectively disposed on opposite sides of the delivery conveyor 141. Each of the lifters 151 is mounted for pivotal movement about a pivot shaft 152 between an extended lifting position and a retracted position, each pair of lifters 151 being carried by an associated one of a pair of mounts 153, respectively fixedly secured to drive chains 154. Each of the drive chains 154 extends along an endless path defined in part by a plurality of sprockets 155 carried by a vertical mounting plate 156 disposed at the adjacent side of the delivery conveyor 141. Each chain 154 is connected to an associated rotary actuator 157 which operates to move the chains 154 back and forth along the loops for moving the lifters 151 vertically among a delivery level at the level of the delivery conveyor 141, a standby level a slight distance above the delivery level, and an access level above the standby level and just below the loading level. The rotary actuator 157 includes a pinion disposed in meshing engagement with a pair of racks, each having its opposite ends respectively coupled to two air cylinders. By selective pressurizing of the various cylinder ports, the actuator may be moved among a number of predetermined positions. The actuator may be of the type sold by PHD, Inc. under the designation "6000 Series". The pinion drives a shaft 158 which spans the delivery conveyor 141 and carries sprockets 159 respectively engaged with the chains 154 for driving them.

Figure 15:
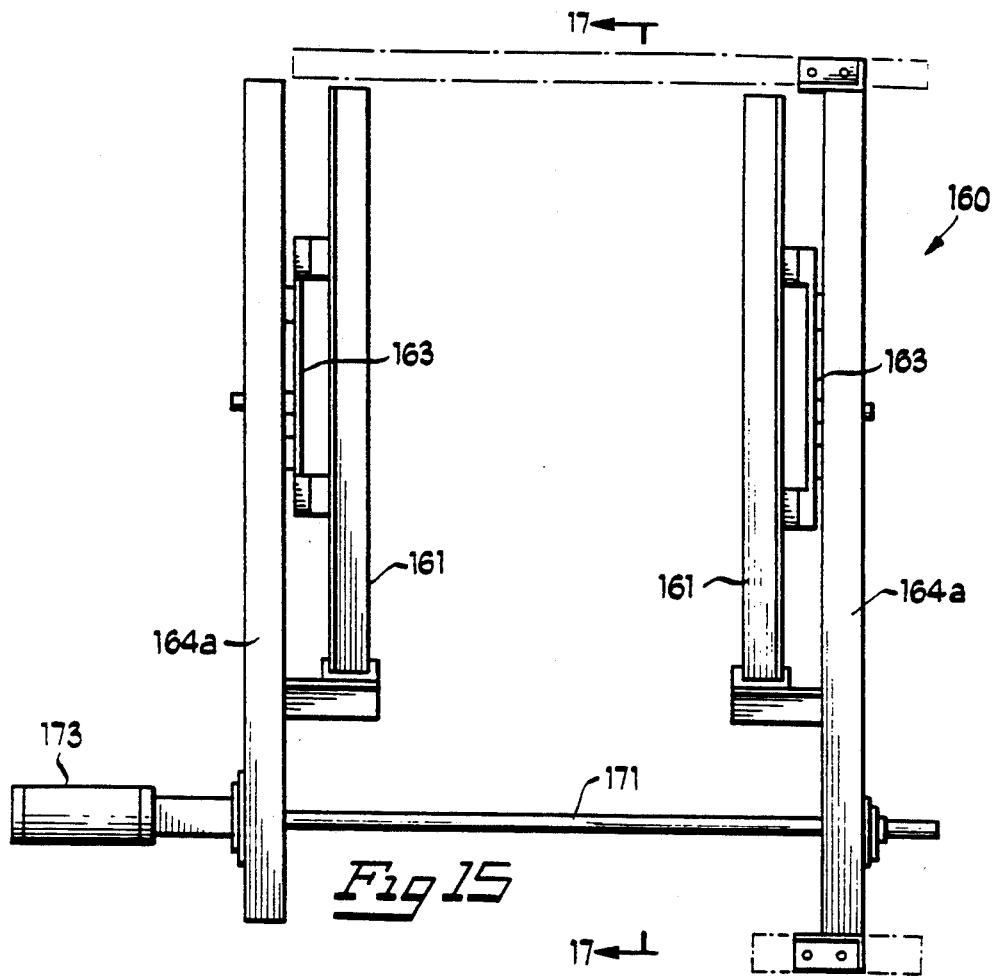
FIG. 15 is an enlarged top plan view of the upper container elevator of the system of FIG. 1.
Figure 16:
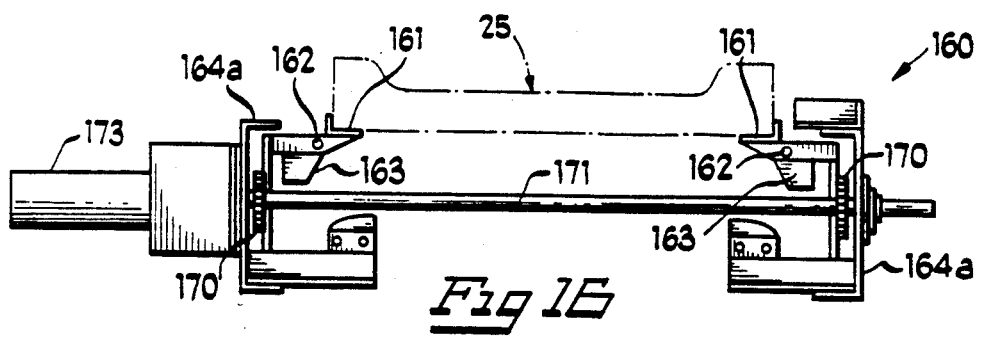
FIG. 16 is an end elevational view of the elevator of FIG. 15.
Figure 17:
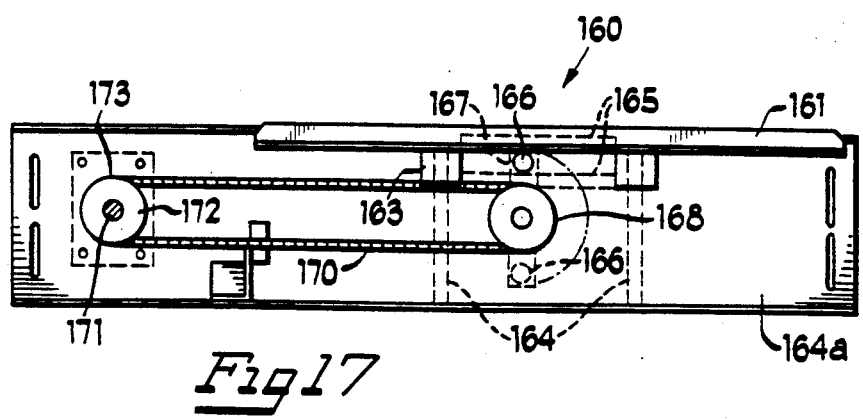
FIG. 17 is a view in vertical section taken along the line 17—17 in FIG. 15.

Referring also to FIGS. 15-17, the container handling system 140 also includes an upper elevator 160 disposed immediately above the elevator 150 and including a pair of lifting bars 161, respectively disposed along opposite sides of a container 25 supported by the lower elevator 150. Each of the lifting bars 161 is mounted on an associated pivot joint 162 carried by an associated support 163 for pivotal movement between an extended lifting position and a raised retracted position The elevator 160 includes two pairs of vertical guide posts 164 respectively disposed at opposite sides of the window conveyor 120 immediately therebeneath on support frames 164a and in guiding engagement with the associated support 163. Each support carries a pair of horizontally extending and vertically spaced-apart cam follower rails 165. Each pair of cam follower rails 165 has a cam roller 166 disposed therebetween for rolling engagement therewith, each cam roller 166 being carried by a cam arm 167 extending radially of an associated sprocket 168. The sprockets 168 are respectively engaged with a pair of endless drive chains 170, each of which also engages a drive shaft 171 operated by a rotary actuator 173. The cam arms 167 are respectively fixed to the drive chains 170 for movement therewith.

It will be appreciated that, as the drive chains 170 are rotated back and forth, the cam arms 167 are pivoted through about 180° around the sprockets 168 between a raised position, illustrated in solid line in FIG. 17 and a lowered position illustrated in broken line in FIG. 17, thereby carrying the cam follower rails 165 and the lifting bars 161 between raised and lowered positions. The lowered position of the lifting bars 161 is at the access level of the elevator 150. Thus, it will be appreciated that the elevator 160 can pick up a container 25 being supported on the elevator 150 at the access level and raise it to the raised position, which corresponds to the loading level for receiving product articles 22 from the loader assembly 110, as described above.

It is a significant aspect of the invention that, because the container handling system 140 includes two elevators 150 and 16, when a container 25 is being carried by the upper elevator 160, the lower elevator 150 is free to move among its several levels for acquiring another container. Similarly, the multiple positions of the elevator 150 permit a container to be lifted from the delivery conveyor 141 to a standby level, thereby permitting additional containers 25 to pass through the loading station on the delivery conveyor 141 to other downstream equipment. This minimizes interruption of the flow of containers along the delivery conveyor 141 if it is servicing more than one orienting and loading system 20. It also serves to greatly speed the container loading operation, since at least one container can always be ready in the standby position while another is being loaded.

Referring also to FIG. 8, control of the orienting and loading system 20 is conducted from an operator interface 180 which may include a video screen 181 and an associated keyboard 182 and associated control switches It is a significant aspect of the invention that the operation of the orienting and loading system 20 is controlled by a programmable logic controller including a processor operating under stored program control, interaction between the operator and the processor being conducted through the operator interface 180.

Figure 18A:
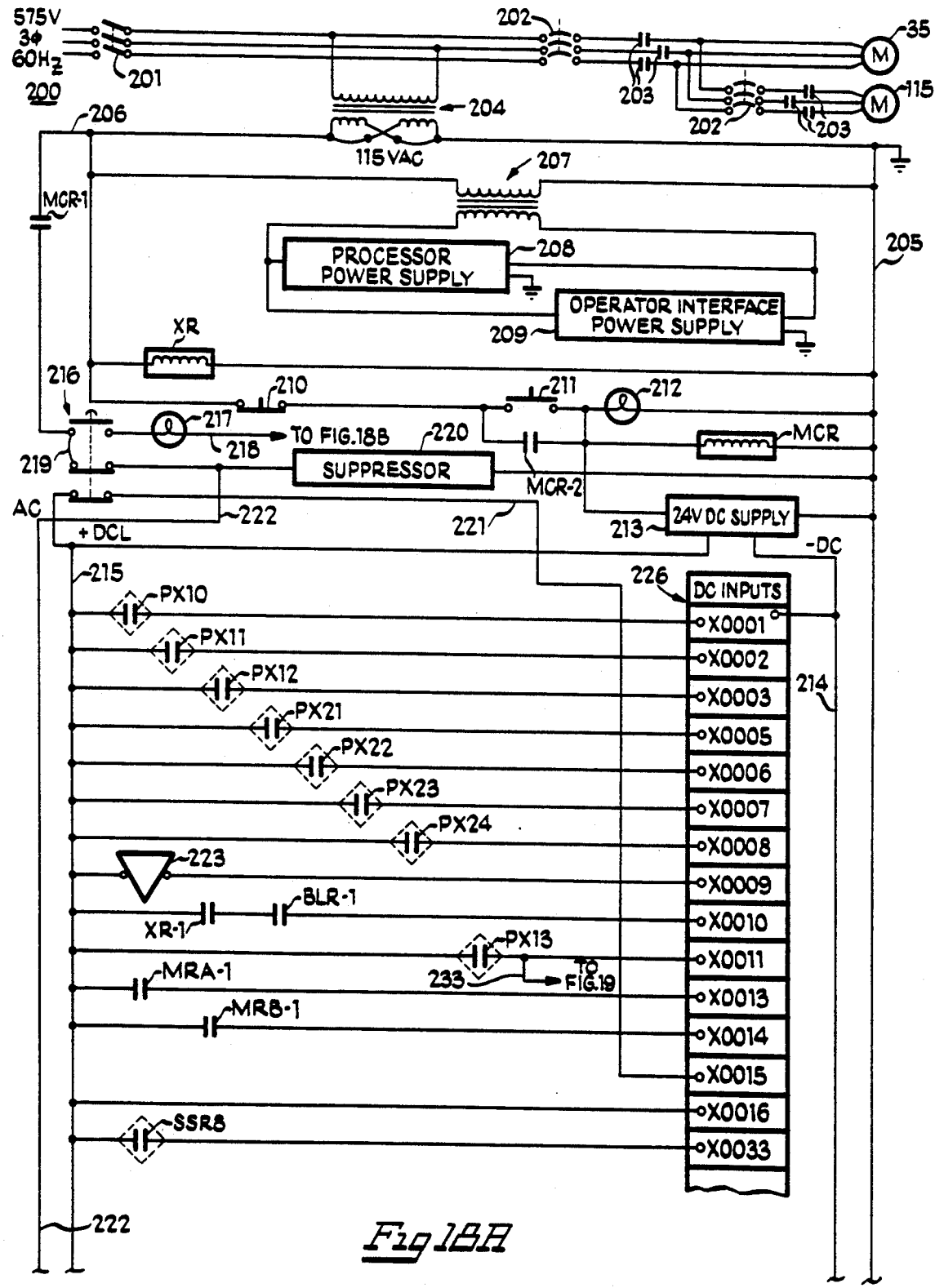
FIG. 18A-18C are a schematic circuit diagram of the control circuit for the system of FIG. 1.
Figure 18B:
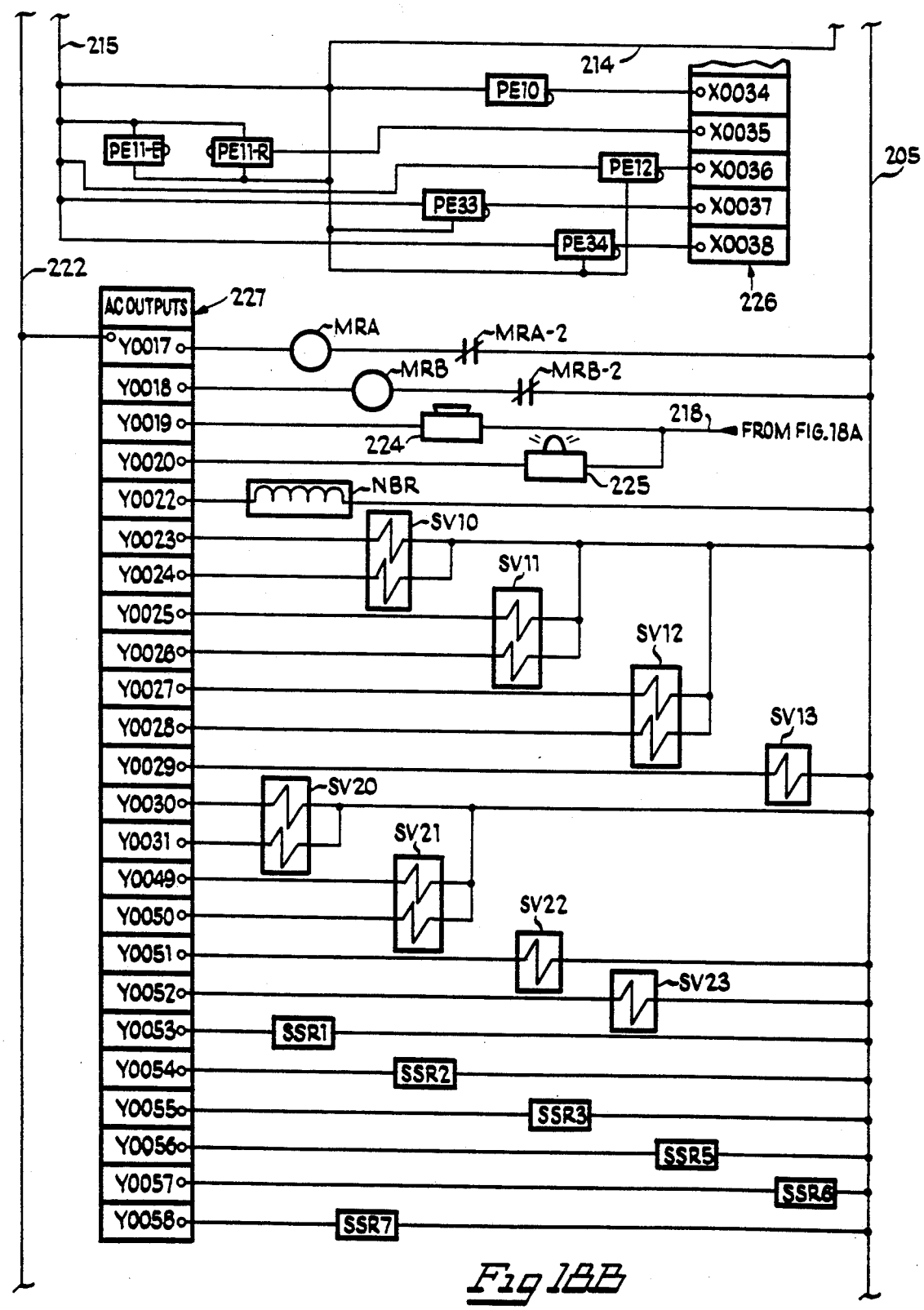
Figure 18C:
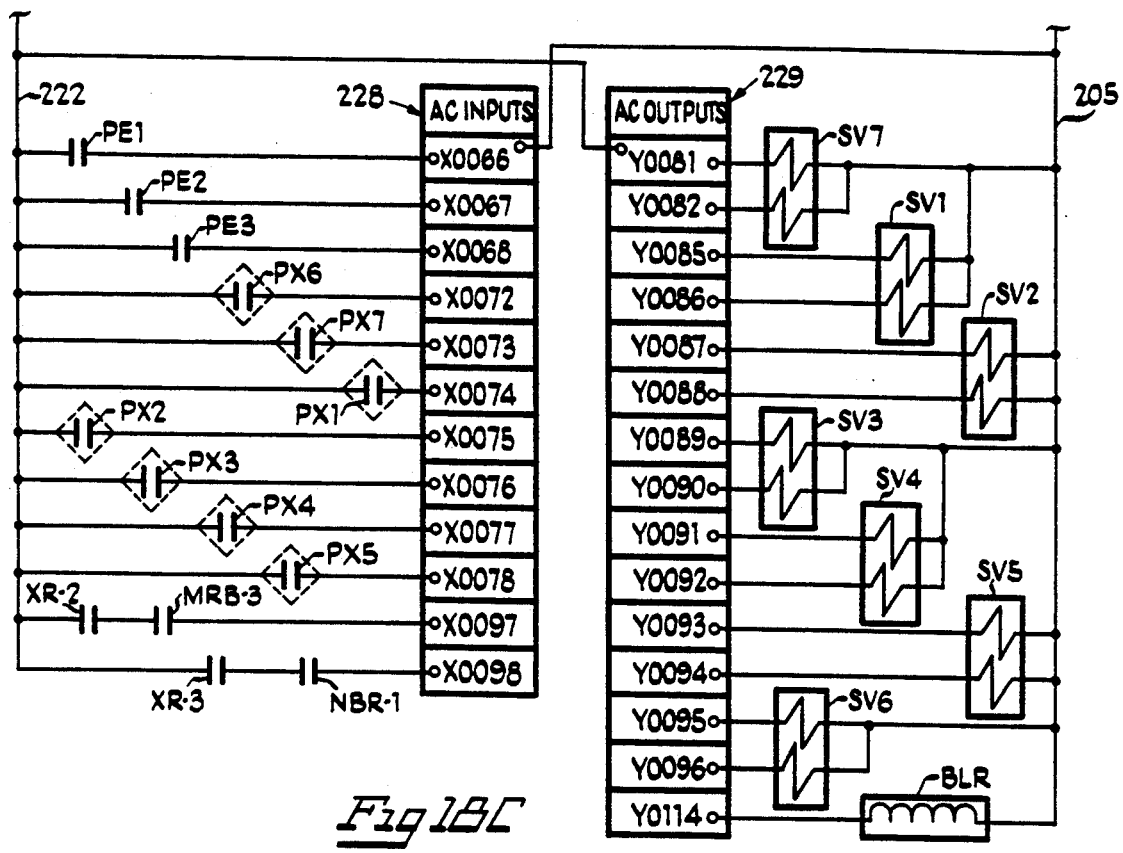

Referring now to FIGS. 18A-18C, the control circuit 200 for the orienting and loading system 20 will be described The motors 35 and 115, which respectively drive the infeed assembly 30 and the loader assembly 110, are driven from a suitable AC supply, such as a 575-volt, three-phase, 60 Hz. supply, through a main disconnect switch 201, motor starter protect switches 202 and starter contactors 203. The primary of a control transformer 204 is connected across one phase of the three-phase supply and steps the voltage down to 115 VAC, the secondary of the transformer 204 being connected across 115 VAC lines 205 and 206. It will be appreciated that suitable fusing (not shown) may be provided in the three-phase circuit and in the 115 VAC circuit. Connected across the secondary of the control transformer 204 is the primary of a constant voltage transformer 207, across the secondary of which are connected in parallel a power supply 208 for the processor of the programmable logic controller and a power supply 209 for the operator interface 180. The programmable controller may be any of a number of different types of commercially available controllers. The disclosed system uses a controller sold by Texas Instruments Company under the designation 525-1104. Other controllers may require different AC supply arrangements. The controller is provided with input and output terminal modules, including a DC input module 226, an AC output module 227, an AC input module 228 and an AC output module 229. Associated with each terminal of these modules is a five-digit number designating the software address of the function associated with that terminal Input terminal addresses begin with the letter "X" while output terminal addresses being with the letter "Y".

Connected across the secondary of the control transformer 204 is the coil of a interlock relay XR. Connected in parallel with the XR relay coil is the series connection of a normally-closed push button power down switch 210, a normally-open push button power up switch 211 and a power on indicator lamp 212. The coil of a master control relay MCR is connected in parallel with the lamp 212 and its normally-open contacts MCR-2 are connected in parallel with the power up switch 211 for latching the circuit in an energized condition in response to momentary closure of the switch 211. Also connected in parallel with the lamp 212 is a 24-VDC supply 213 which provides a 24-VDC output voltage across a −DC line 214 and a +DCL line 215. The line 206 of the 115 VAC supply is connected through the normally-open contacts MCR-1 of the master control relay MCR to one normally-open pole of a three-pole push button emergency stop switch 216. The other fixed contact of that pole is connected through a lamp 217 to the common line 205 and to a line 218, discussed more fully below. The normally-open pole of the switch 216 is connected by a jumper 219 to a fixed contact of a normally-closed pole, the other contact of which is connected through a surge suppressor 220 to the common line 205. The third pole of the switch 216 is also normally-closed, and has one fixed contact thereof connected to the +DCL line 215 and the other fixed contact thereof connected to a line 221 to be discussed further below. The junction between the surge suppressor 220 and the emergency stop switch 216 is connected to an AC supply line 222.

It will be appreciated that when the power up switch 211 is closed, the control circuit 200 is powered up. If it is desired to shut the system down, the power down switch 210 is actuated to remove the AC voltage from the 24-VDC supply 213 and to reopen the relay contacts MCR-1 to remove the AC supply voltage from the remainder of the circuitry.

The −DC supply line 214 is connected to the DC input terminal module 226 of the programmable controller Respectively connected in parallel between the +DCL line 215 and corresponding DC input terminals of the controller are proximity switches PX10–PX13 and PX21–PX24. Also connected in parallel between the +DCL line 215 and corresponding DC input terminals of the controller are a guard switch 223, normally-open contacts MRA-1 and MRB-1, respectively, of an infeed motor starter MRA and loader motor starter MRB, and the contacts of a solid state relay SSR8. Also connected in parallel across the DC supply lines 214 and 215 are reflector-type photo eyes PE10, PE12, PE33 and PE34, the receiver terminals of which are respectively connected to corresponding DC input terminals of the controller Also connected in parallel across the DC supply lines 214 and 215 are the emitter and receiver of a photo eye PE11, the receiver of which is connected to a corresponding DC input terminal of the controller.

The AC supply line 222 is connected to the AC output terminal modules 227 and 229, while the AC supply common line 205 is connected to the AC input terminal module 228. The motor starter MRA for the infeed motor 35 and its contacts MRA-2 are connected in series between the AC line 205 and a corresponding AC output terminal of the controller. Similarly, the motor starter MRB for the drive motor 115 and its contacts MRB-2 are connected in series between the line 205 and a corresponding AC output terminal of the controller The contacts MRA-2 and MRB-2 are normally open contacts, but they are closed whenever the motor circuit protector switches 202 are closed and are, therefore, illustrated as closed in FIG. 18B. An alarm horn 224 and an alarm beacon 225 are connected between the line 218 from the emergency stop switch 216 and corresponding AC outputs of the controller. Respectively connected between corresponding AC outputs of the processor and the AC line 205 are coils of a need basket relay NBR and a basket lifted relay BLR, and the actuators of solid state relays SSR1, SSR2, SSR3, SSR5, SSR6 and SSR7. Also connected between the AC line 205 and corresponding AC output terminals of the controller are solenoid valves SV10–SV13 and SV20–SV23 and SV1–SV7. Connected between the AC line 222 and corresponding AC input terminals of the controller are photo eyes PE1–PE3 and proximity switches PX1–PX7. Also connected in series between the line 222 and one of the AC input terminals of the controller are the normally-open contacts XR-2 of the interlock relay XR and the normally-open contacts MRB-3 of the motor starter MRB. Also connected in series between the line 222 and the corresponding AC input terminal of the controller are the normally-open contacts XR-3 of the interlock relay and the normally-open contacts NBR-1 of the need basket relay NBR.

Figure 19:
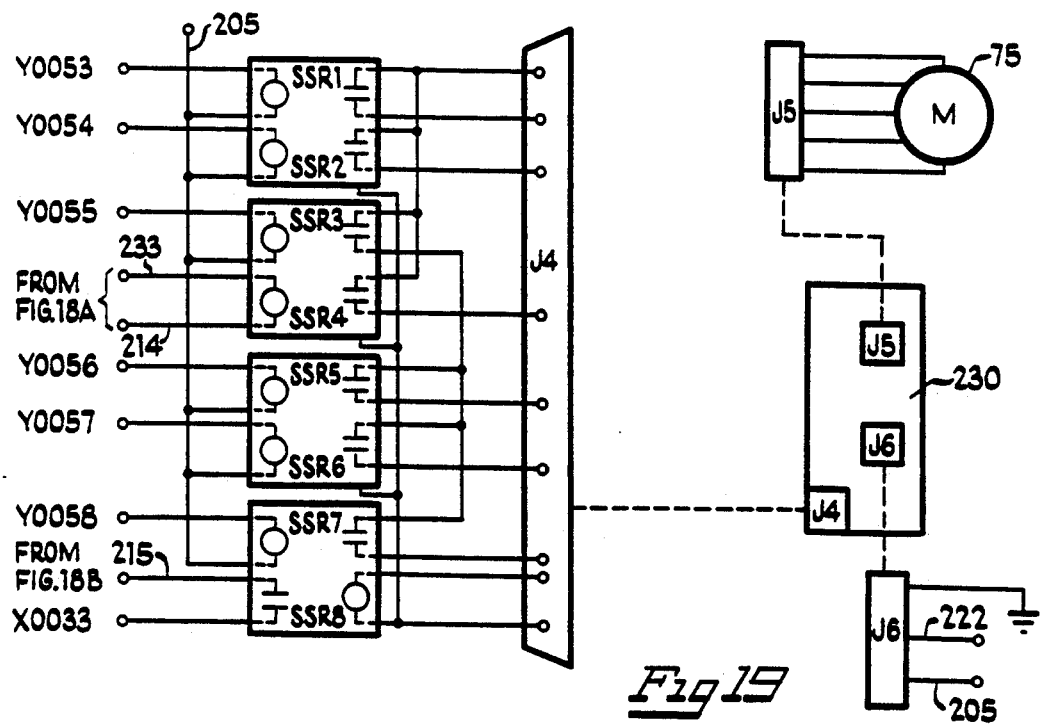
FIG. 19 is a schematic circuit diagram of the stepper motor controller of the system of FIG. 1.

Referring to FIG. 19, the stepper motor 75 is provided with a controller 230 which has its own internal software This controller has connector sockets J4, J5, and J6 which receive mating connectors, the connector J5 being connected to the terminals of the stepper motor 75, the connector J6 being connected to the ground terminal and the AC lines 222 and 205 and the connector J4 being connected to the contacts of the solid state relays SSR1–SSR7 and to the actuator of the relay SSR8. The contacts of the relay SSR8 are connected across the DCL line 215 and a DC input terminal of the controller, as can also be seen in FIG. 18A. The actuator of the solid state relay SSR4 is connected across the −DC line 214 and the line 233 (see FIG. 18A). The actuators of the other solid state relays are connected between the AC line 205 and corresponding AC output terminals of the processor, as was described above in connection with FIG. 18B.

The signals from the controller AC output terminals connected to the solid state relays SSR5–SSR7 serve to select the particular program routine of the stepper controller 230 which corresponds to a preselected rotation of the turntable platform 71 for orienting the product articles 22. The stepper motor 75 will be operable only when the controller start relay SSR1 and the master stepper control relay SSR3 are actuated and the turntable platform 71 is in its raised position, as indicated by a signal to the relay SSR4. Whenever the turntable is in a rotating routine, a busy signal will appear at the relay SSR8 to prevent initiation of a further rotation program. A stop signal from the controller to the relay SSR2 will cause the stepper motor 75 to stop.

It is believed that the operation of the control circuit 200 and the stepper controller 230 in conjunction with the associated program software set forth in the Microfiche Appendix will be readily understood by those skilled in the art. However, there follows a simplified explanation of the overall operation of the orienting and loading system 20, with reference to the control circuit 200 and the stepper controller 230. To operate the orienting and loading system 20, the main disconnect switch 201 must be closed. This provides power to the operator interface 180 via the power supply 209 and to the system processor via the power supply 208. When the power up switch 211 is closed, it is latched through the contacts MCR-2 of the master control relay MCR, the lamp 212 being illuminated to indicate that power is on. This energizes the 24-VDC supply 213 for supplying DC power to the programmable controller, while closure of the relay contacts MCR-1 provides AC power to the programmable controller via the AC line 222 through the emergency stop switch 216. The system 20 is now ready for the operator to select product information via the operator interface 180. In this regard, a product selection screen will appear on the video monitor 181, instructing the operator to select the product pattern to load via the keyboard 182. Once a product pattern is selected, all the designated timing and counting registers are loaded from product storage registers into sequencer registers in the processor software. The operator has the choice of running a fixed number of articles or running continuously until a new product pattern is selected. After the choice has been made the start up screen is displayed and the system 20 is ready to run.

When the motor circuit protector switches 203 are enabled, the drive motors 35 and 115 for the infeed assembly 30 and the loader assembly 110 can be started by the operator from the keyboard 182. More specifically, the processor outputs AC signals at addresses Y0017 and Y0018 to the starters MRA and MRB, which close their contacts MRA-1 and MRB-1 to provide DC input signals to the processor at addresses X0013 and X0014. The infeed conveyor 40, the separating conveyor 50 and the powered disk conveyor 61 all begin operating and the loader assembly 110 is enabled.

Each time a product article 22 blocks the infeed photo eye PE10, it inputs a DC signal to the processor at address X0034. The infeed motor 35 will shut off and dwell if the photo eye PE10 is not blocked by product for a predetermined time period, and will restart when the photo eye PE10 is again blocked. Normally, the stop gate 55 is lowered. Thus, as product passes onto the separating conveyor 50, its higher speed creates a separation between product articles 22 At this transfer to the separating conveyor 50, the product articles 22 are counted by the count photo eye PE11, which inputs DC signals to the processor at address X0035 to increment a software counter.

The articles traveling along the separating conveyor 50 are stopped by the stop gate 57, which is normally closed. When the article counter has reached a predetermined count an AC signal will be output to the solenoid valve SV10 at address Y0023 to actuate the drive cylinder 56 and raise the stop gate 55 to hold back additional articles 22 until the previous group of articles 22 is advanced past the stop gate 57.

If the turntable platform 71 is in its lowered position, it will actuate the proximity sensor PX12 to input a DC signal to the processor at address X0003. If this occurs when the stop gate 55 is raised, the processor outputs an AC signal at address Y0026 to the solenoid valve SV11 to cause the drive cylinder 58 to lower the stop gate 57, allowing the assembled articles to pass from the separating conveyor 50 to the powered disk conveyor 61.

The infeed conveyor position counter proximity sensor PX10 is mounted near the drive shaft 39 for counting the teeth of the sprocket 53, each sprocket tooth causing a DC signal to the input of the controller at address X0001 for incrementing a number of software counters When one counter has reached a predetermined value after lowering of the stop gate 57, the processor will output an AC signal at address Y0024 to the solenoid valve SV10 to lower the stop gate 55 and allow additional articles to pass onto the infeed conveyor 40.

The proximity sensor PX10 will increment counters for each of the several areas of the infeed assembly 30. When a counter corresponding to the powered disk conveyor 61 has reached a predetermined count after lowering of the stop gate 57, this will indicate that the articles on separating conveyor 50 should have passed completely onto the powered disk conveyor 61 This will cause the processor to output an AC signal at address Y0025 to the solenoid valve SV11 to raise the stop gate 57 back to its normal stop position. It will also output an AC signal at address Y0027 to the solenoid valve SV12 to cause the lower air bags 79 of the turntable 70 to be inflated to raise the platform 71, lifting the articles 22 a slight distance above the powered disk conveyor 61 When the platform 71 reaches its raised position, it actuates the proximity sensor PX11 to input a DC signal to the processor at address X0002. This will cause the processor to output AC signals to solid state relays SSR1-SSR3 and SSR5-SSR7 at addresses Y00-53-Y0058 for actuating the stepper motor 75 through the stepper motor controller 230 (FIG. 19) to index the platform 71 through the required rotation to orient the articles 22 to the selected pattern The stepper controller 230 is programmed so that the platform 71 can rotate bidirectionally in any 90° or 180° increment. During the stepper drive cycle, a turn in progress signal is sent to the processor at address X0033 to prevent the platform 71 from being lowered.

Once the turntable assembly 70 has completed its cycle, the processor will output an AC signal at address Y0028 to the solenoid valve SV12 for deflating the lower air bags 79 and inflating the upper air bags 79 to lower the platform 71, returning the articles to the powered disk conveyor 61. Since the turntable assembly 70 can rotate in only 90° or 180° increments, the disks 63 will still fit through the cruciform slots 72 to permit return of the platform 71 to its lowered position. In its lowered position, the platform 71 will actuate the proximity switch PX13 to input a DC signal to the processor at address X0011.

When the articles 22 have been returned to the powered disk conveyor 61, it will convey them from the orienting assembly 60 to the transfer conveyor assembly 80 As the articles block the photo eye PE12 at the exit of the orienting assembly 60, it will then input a DC signal to the processor at address X0036 causing it to output an AC signal at address Y0029 to the solenoid valve SV13 for engaging the clutch 83 on the drive shaft 66 to start the transfer conveyor belt 81. The transfer conveyor assembly 80 will run until the photo eye PE12 is cleared, if the pattern of articles is to be combined with another pattern before being pushed onto the loader assembly 110. If the pattern is not to be combined with another pattern, the transfer conveyor assembly 80 will run until a predetermined position count value has been reached in response to counter proximity sensor PX10. The stop plate 85 will prevent the articles from falling off the end of the transfer conveyor belt 81.

When the transfer conveyor assembly 80 has stopped, the processor will output a push signal at address Y0030 to the solenoid valve SV20 for actuating the transfer pusher assembly 90, if the window conveyor 120 and the loading pusher assembly 130 are in their home positions, as indicated by DC signals being input to the processor at addresses X0007 and X0008 from the proximity switches PX23 and PX24, respectively. These home positions are illustrated in FIG. 4A. The pusher vane 100 will normally be disposed in its extended pushing position. The push signal will cause the cylinder 96 to be actuated to extend the carriage 95 and push the pattern of articles 22 laterally from the transfer conveyor belt 81 onto the conveyor section 128 of the window conveyor 120. When the carriage 95 has reached its fully extended position, illustrated in solid line in FIG. 3, it will actuate the proximity sensor PX21 to input a DC signal to the processor at address X0005. If the processor is calling for a load cycle, the transfer pusher assembly 90 will remain in its extended position until the loading pusher assembly 130 is moved from its home position.

If a load cycle is not being called for, such as if the system is set to push two patterns of articles onto the loader assembly 110 before loading into a container, the transfer pusher assembly 90 will retract. More specifically, the processor will output an AC signal at address Y0049 to the solenoid valve SV21 for causing the actuator 102 to rotate the pusher vane 100 up to its retracted position, illustrated in broken line in FIG. 3, and then an AC signal at address Y0031 to the solenoid valve SV20 will cause the cylinder 96 to retract the carriage 95. In its retracted position, the pusher vane 100 will clear any additional product articles 22 which have come onto the transfer conveyor assembly 80. When the transfer pusher assembly 90 is fully retracted, it actuates the proximity switch PX22 to input a DC signal to the processor at addresses X0006, causing it to output a signal at address Y0049 to the solenoid valve SV21 for rotating the pusher vane 100 back down to its extended pushing position.

A load cycle can begin when the transfer pusher assembly 90 is fully extended, as indicated by proximity switch PX21, a container 25 is present at the loading level, as indicated by photo eye PE33 inputting a DC signal to the processor at address X0037, and a load sequencer bit is enabled in software indicating the necessary pattern or patterns of articles have been transferred onto the loader assembly 110. At this point, the processor will output an AC signal at address Y0051 to actuate the solenoid valve SV22 for engaging the clutch 133 of the pusher assembly drive shaft 131 for starting the pusher assembly 130. After a predetermined time delay, which starts when the loading pusher assembly 130 leaves its home position, as sensed by proximity sensor PX23, for inputting a DC signal to the processor at address X0007, the processor will output an AC signal at address Y0052 to actuate the solenoid valve SV23, for engaging the window conveyor drive shaft clutch 123 to start the window conveyor 120.

As was described above, the window conveyor 120 and the loading pusher assembly 130 work together, the pusher paddle 137 advancing the articles 22 toward the discharge end of the window conveyor 120, while the window section 129 of the window conveyor 120 runs out from under the articles 22 in the opposite direction, allowing the articles to pass through the window section 129 into the container 25, as the discharge bar 138 advances the container 25 toward the discharge of the system. The window conveyor 120 and the loading pusher assembly 130 continue to rotate through one complete revolution until they return to their home positions, at which point the proximity switches PX23 and PX24 input DC signals to the processor at addresses X0007 and X0008 to disengage the clutches 123 and 133. If either of the proximity switches PX23 and PX24 is not actuated within a predetermined time period after start of the product load cycle, a "jam fault" or a "loader belt jam" message will be displayed on the video monitor 181 of the operator interface 180.

Referring in particular to FIGS. 12-14 and 18C, the container handling system 140 delivers containers 25 to the loading station along the delivery conveyor 141. When a container is stopped at the loading station it will block the photo eye PE3, which will input an AC signal to the processor at address X0068. In this condition, when a container is required by the loader assembly 110, the processor will output signals at addresses Y0086, Y0087 and Y0090 to the solenoid valves SV1-SV3 for actuating the rotary actuator 157 to raise the container elevator 150 from its delivery level to its standby level. In this regard, the lifters 151 will engage the bottom wall 26 of the container 25 along the opposite ends thereof. When the container 25 reaches the standby level, it will actuate the proximity sensor PX2 to input an AC signal to the processor at address X0075. When the container is lifted from the delivery position, clearing the photo eye PE3, the processor will output an AC signal at address Y0095 to the solenoid valve SV6 to raise the stop plate 147 to its release position to allow the next container to pass through to the stop plate 144 at the loading station. As soon as the container which had been held by the stop plate 147 is released, it will clear the photo eye PE2 as long as there is no following basket in abutting engagement with it. This clearance will remove an AC signal from the processor at address X0067, causing an output signal at address Y0096 to the solenoid valve SV6 for reclosing the stop plate 147. Normally, the next basket will be following sufficiently closely behind that the stop plate 147 will drop inside of it to its closed position for engaging the inside surface of the trailing wall of the container. If the container which is released from the stop plate 147 is abutting the following container, the photo eye PE2 will not be cleared. In this case, the processor will reclose the stop plate 147 a predetermined time period after it is opened such that it will stop the following container. Thus, the stop plate 147 will maintain a spacing between the container and the loading station and following containers.

The stop plate 144 at the loading station will remain closed unless a downstream orienting and loading system 20 sends a signal indicating that it requires containers. In that event, the processor will output an AC signal at address Y0094 to the solenoid valve SV5 for opening the stop plate 144. It will remain open until the downstream need is filled, at which point the processor will output a signal at address Y0093 to the solenoid valve SV5 for closing the stop plate 144. Stop plate 144 will lower if a downstream orienting and loading system 20 requires a container.

After a loaded container has been discharged from the loader assembly 110, as described above, the proximity sensor PX4 will be cleared, signalling that another empty container is needed at the loading level. The processor will respond by outputting signals to the solenoid valves SV1-SV3, causing the container elevator 150 to raise the next container 25 from the standby level to the access level, where the proximity sensor PX3 is closed, inputting an AC signal to the processor at address X0076. The processor responds by outputting an AC signal at address Y0092 to the solenoid valve SV4 for lowering the upper elevator 160 from its raised position at the loading level to its lowered position at the access level by actuating the drive cylinder 173. During this movement, the lifting bars 161 will pivot upwardly as they engage the container supported on the elevator 150 and will then snap back to their extended lifting positions as they pass below the container. When the elevator 160 reaches its lowered position, it actuates the proximity sensor PX5 to input an AC signal to the processor at address X0078, causing an output signal at address Y0091 to the solenoid valve SV4 for raising the elevator 160 back to its raised position, lifting the container to the loading level, at which point the proximity sensor PX4 is again actuated. The container is now ready to be loaded. The solenoid valves SV1-SV3 are then again actuated to return the elevator 150 to its lowermost position at the delivery level. During this movement, the lifters 151 will pivot upwardly as they engage the next container at the loading station on the delivery conveyor 141 and will snap back to their extended lifting positions as they pass below the container. When the elevator 150 reaches the delivery level the proximity sensor PX1 is actuated to again energize the solenoid valves SV1-SV3 to raise the container from the delivery conveyor 141 to the standby level.

In the event of an emergency the orienting and loading system 20 can be shut down by actuation of the emergency stop switch 216. The closure of the normally-open pole will energize the emergency lamp 217 and the emergency alarm horn 224 and beacon 225. The opening of the normally-closed poles will disconnect the DC and AC supply voltages from the controller. It will be appreciated that the system 20 could also be stopped by actuating the power down switch 210, which deenergizes the 24 VDC supply 213 and deenergizes the master control relay MCR for opening the AC supply at the contacts MCR-1.

From the foregoing, it can be seen that there has been provided an improved product orienting and loading system which provides orienting of product without pushing thereof, provides rapid loading of the product into containers and provides effective supply of containers to the loading system without interrupting the supply to adjacent systems.

We claim:

1. Product orienting apparatus comprising: conveyor means including a plurality of spaced-apart disks mounted for rotation about parallel axes and being substantially tangent to a common support plane, turntable means including a platform disposed substantially parallel to said support plane and having a plurality of slots therethrough each cruciform in shape, rotating means for rotating said platform about an axis disposed substantially perpendicular to said support plane, and lift means for moving said platform parallel to said axis between a lowered position below said support plane with said disks received through said slots and a raised position above said support plane to accommodate rotation of said platform, said slots being shaped to receive said disks therethrough in only a limited number of predetermined rotational orientations of said platform spaced substantially 90° apart.

2. The apparatus of claim 1, wherein said rotating means includes a stepper motor.

3. The apparatus of claim 1, and further comprising frame means for supporting said rotating means and said turntable means, said lift means including means for raising and lowering said frame means.

4. Apparatus for loading product into a container comprising: support means for holding a container in a loading position, endless loading means overlying the loading position for movement along an endless path and including a conveyor section for supporting product and a window section for allowing product to drop therethrough, transfer means for moving product onto said conveyor section, shifting means engageable with the product when it is supported on said conveyor section of said loading means, and motive means for respectively moving said loading means and said shifting means in opposite directions relative to the product to shift the product from said conveyor section through said window section and into a container supported in the loading position.

5. The apparatus of claim 4, and further comprising means for moving the container in a discharge direction during shifting of the product thereinto from said conveyor section.

6. The apparatus of claim 5, wherein said means for moving a container is carried by said endless loading means.

7. The apparatus of claim 4, wherein said shifting means includes a pusher member engageable with the product at one end thereof.

8. The apparatus of claim 4, wherein said shifting means includes means movable along an endless path.

9. The apparatus of claim 8, wherein said shifting means overlies said loading means and causes the product to move relative to said loading means so that said conveyor section moves out from beneath the product.

10. The apparatus of claim 8, wherein each of said loading means and said shifting means moves once around its endless path during the shifting of product from said conveyor section into a container.

11. Apparatus for loading product into a container at a loading level of a loading station comprising: container supply means for delivering a container to the loading station at a delivery level spaced substantially vertically from the loading level, first elevator means at the loading station for moving a container from the delivery level to an access level intermediate the delivery and loading levels, second elevator means at the loading station for moving a container from the access level to the loading level, and loading means at the loading station for loading product into the container at the loading level.

12. The apparatus of claim 11, wherein said first elevator means includes means for moving the container to a standby level intermediate the delivery and access levels.

13. The apparatus of claim 11, and further comprising discharge means for moving the loaded container from the loading station.

14. The apparatus of claim 11, wherein the loading level is disposed above the delivery level.

15. The apparatus of claim 11, wherein each of said first and second elevator means includes a plurality of lifters engageable with a container along opposite sides thereof.

16. The apparatus of claim 15, wherein each of said lifters includes means accommodating pivotal movement thereof between an extended position for lifting engagement with the container and a retracted position accommodating movement past the container.

17. Apparatus for orienting a product and loading the product into a container at a loading level of a loading station, said apparatus comprising: conveyor means including a plurality of spaced-apart disks mounted for rotation about parallel axes and being substantially tangent to a common support plane, turntable means including a platform disposed substantially parallel to said support plane and having a plurality of slots therethrough, rotating means for rotating said platform about an axis disposed substantially perpendicular to said support plane to orient the product, lift means for moving said platform parallel to said axis between a lowered position below said support plane with said disks received through said slots and a raised position above said support plane to accommodate rotation of said platform, said slots being shaped to receive said disks therethrough in only a limited number of predetermined rotational orientations of said platform, transfer means for moving the oriented product from said turntable means to the loading station, container supply means for delivering a container to the loading station at a delivery level spaced substantially vertically from the loading level, first elevator means at the loading station for moving a container from the delivery level to an access level intermediate the delivery and loading levels, second elevator means at the loading station for moving a container from the access level to the loading level, endless loading means overlying the loading level for movement along an endless path and including a conveyor section for supporting product and a window section for allowing product to drop therethrough, said transfer means including means for moving oriented product onto said conveyor section, shifting means engageable with the product when it is supported on said conveyor section of said loading means, and motive means for respectively moving said loading means and said shifting means in opposite directions relative to the product to shift the product from said conveyor section through said window section and into a container supported at the loading level.

18. The apparatus of claim 17, wherein said first elevator means includes means for moving the container to a standby level intermediate the delivery and access levels.

19. The apparatus of claim 18, wherein the loading level is disposed above the delivery level.

20. The apparatus of claim 17, wherein the predetermined rotational orientations of said platform are spaced substantially 90° apart, each of said slots being substantially cruciform in shape.

21. The apparatus of claim 17, wherein said shifting means includes means movable along an endless path.

22. The apparatus of claim 21, wherein said endless loading means includes means for moving the container in a discharge direction during shifting of the product thereinto from said conveyor section.

* * * * *